Oct. 29, 1963  W. M. PELINO  3,108,772
HOT-BOX DETECTOR ALARM CIRCUIT
Filed March 14, 1960
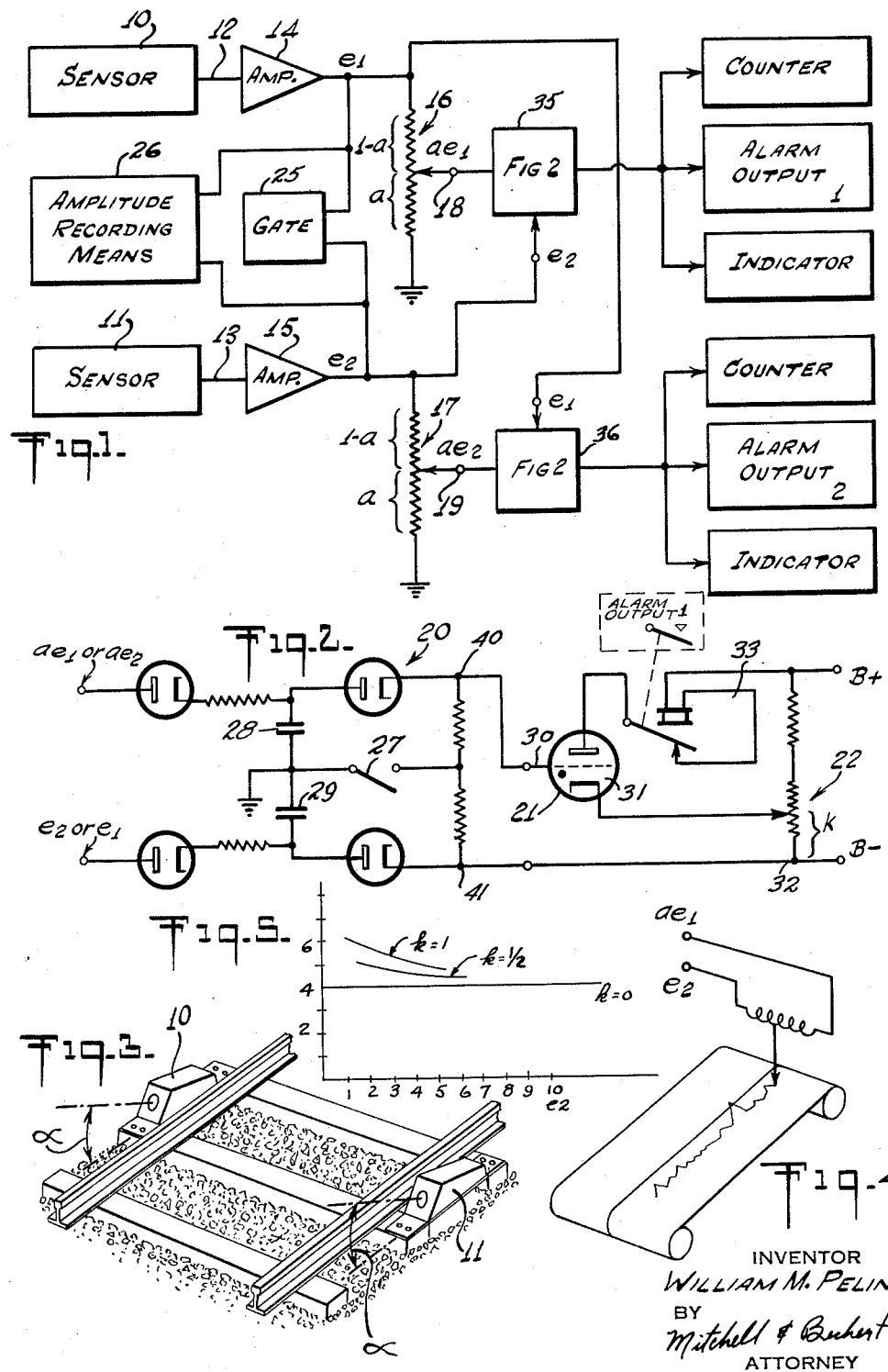
INVENTOR
WILLIAM M. PELINO
BY
Mitchell & Buhert
ATTORNEY

United States Patent Office 3,108,772
Patented Oct. 29, 1963

3,108,772
HOT-BOX DETECTOR ALARM CIRCUIT
William M. Pelino, Garden City, N.Y., assignor to Servo Corporation of America, Hicksville, N.Y., a corporation of New York
Filed Mar. 14, 1960, Ser. No. 14,931
18 Claims. (Cl. 246—169)

The invention relates to an improved hot-box detector of the variety which is mounted alongside a railway track, and which automatically remotely responds to yield an indication or warning of the passage of an overheated journal box. This application incorporates improvements over co-pending application, Series No. 815,951, filed May 26, 1959, in the names of Harold Remz and William M. Pelino, now Patent No. 2,963,575, issued on December 6, 1960.

In hot-box detectors as previously disclosed, heat-responsive cells have been placed on opposite sides of the track, and they have been used to separately evaluate the thermal conditions of passing journal boxes at the opposite ends of rolling-stock axles. These detectors have usually been connected to graphical recording means so that an operator may interpret the record to determine whether an excessively hot journal box has been observed. Unfortunately, this type of observation requires that the operator possess some skill in noting whether the journals are of the so-called plain-bearing or roller-bearing type, it being noted that roller bearings consistently run at higher temperatures than plain bearings. Thus, to an unskilled operator, roller bearings can give false indications of excessively hot journal conditions. As long as an operator must use his intelligence to determine whether a given apparently excessive signal is due to a bad plain bearing or to a normal roller bearing or to a bad roller bearing, it is virtually imposible to employ ordinary threshold techniques for having such devices operate automatic alarms.

In Patent No. 2,963,575 there is described an arrangement whereby duplicate heat-responsive cells are actually mounted on both sides of a section of track so that, at any one longitudinal location along the track, the opposite ends of the axles of passing rolling stock can be monitored simultaneously. Optics continuously image the cell at each end of the axle in the plane of the passing journal boxes, and moved gating means are employed whereby not only may there be assurance that the cells "look at" only journal boxes, but there may also be the further assurance that those journal boxes will not be on locomotives or passenger cars.

The invention described in said co-pending application is characterized by means for differentially evaluating the outputs of the heat-responsive means for pairs of passing railroad journal boxes or axles and operating an alarm circuit upon detecting a difference exceeding a given threshold level.

However, under certain circumstances, it is desired to provide compensation for varying sensitivities and attenuations due, for example, to environmental conditions. Factors such as ambient temperature, speed of trains, fog, snow, deterioration of system response, etc., contribute to varying outputs from the detector amplifiers when one train is compared to another. These factors, of course, are only a few of those for which compensation may be desired.

Accordingly, it is an object of the present invention to provide an improved hot-box detector construction which is adaptable to compensate automatically for various conditions.

It is another object to provide an improved hot-box detector construction in which a reliable alarm may be provided for the circumstance of a detected journal box of excessive temperature, more or less regardless of the speed of a passing train and regardless of the type of bearing (namely, roller or plain bearing) involved.

It is a specific object to provide an automatic alarm system of the character indicated in which the system will automatically discriminate against undesired rolling stock, as, for example, locomotives and passenger cars, so that in such case the alarm will be set off only for excessively warm freight-car journals.

It is another specific object to meet the above objects with a device which may not only automatically yield an alarm for each hot-box detected on a given train, but which may also identify the particular end of the particular axle giving rise to the trouble, so that the faulty journal box may be immediately located and the troublesome car set out, with minimum down-time, thus reducing delays in train schedules.

A further object of the invention is to provide an improved hot-box detector construction which compensates for varying sensitivities and attenuations.

Other objects and various further features of novelty and invention will be pointed out or will occur to those skilled in the art from a reading of the following specification in conjunction with the accompanying drawings. In said drawings, which, show for illustrative purposes only, preferred forms of the invention:

FIG. 1 is an electrical circuit diagram illustrating an arrangement of component parts in accordance with the invention;

FIG. 2 is a portion of the electrical circuit diagram shown in FIG. 1;

FIG. 3 is a fragmentary view in perspective illustrating the invention and showing a section of track to which the detector (or sensor) is applied;

FIG. 4 is a diagrammatic illustration of one indicator for use with the invention; and FIG. 5 is a graph illustrating the variation of certain parameters.

The present invention, like the invention in said co-pending application, features automatic alarm systems whereby a separate alarm is sounded for each hot-box detected on a passing train; the alarm may include an indicator clearly displaying not only the side of the train on which the fault arises but also the axle location on the train. Provision is made for automatic indication of plural hot-box conditions on a given train, so that the need for checking the whole train is completely avoided and the faulty car or cars may be quickly set out so as to reduce to an absolute minimum any possible loss of scheduled train time.

However, the alarm provided by the invention in said co-pending application is energized by a voltage differential between the amplitudes of signals from detectors or sensors on opposite sides of the track. Therefore, if both detectors or sensors are attenuated by, for example, fine swirling snow, fog, etc., a much greater voltage difference is needed to provide a differential potential of sufficient magnitude to overcome the preset bias potential. In other words, a defective journal must be much hotter to trip the alarm.

In accordance with the present invention, however, the alarm is energized by a potential computed from the ratio of the voltages from detectors or sensors on opposite sides of the track as will now be described in greater detail. Although the description refers to sensor units being on opposite sides of the track, it will be understood that the units may be mounted on the same side of the track, if desired.

Referring to the drawings, two detector or sensor units 10 and 11, FIG. 1, are mounted on opposite sides of a given section of railway track (FIG. 3) and, preferably, are duplicates of each other. Each of the sensor units may include an active heat-responsive cell, such as a so-called thermistor flake for example, connected in a bridge circuit with a second or compensator cell which is shielded from incident radiation and, therefore, responsive only to ambient temperature.

The outputs from the sensor units 10 and 11 are available over lines 12 and 13, respectively, to preamplifier units 14 and 15. The outputs from the preamplifiers 14 and 15, in turn, are represented by the voltages $e_1$ and $e_2$, respectively.

In accordance with the invention, the voltages $e_1$ and $e_2$ are adjusted so that $e_1$ equals $e_2$ by, for example, adjusting the gain of the amplifier units 14 and 15.

Across each of the voltages $e_1$ and $e_2$ a suitable voltage divider, such as a potentiometer indicated generally by the numerals 16 and 17, is connected to provide an adjustable potential at terminals 18 and 19, respectively. With each potentiometer 16 and 17 adjusted in accordance with the principles of the invention, the potentiometer setting represented by the letter $a$ in FIG. 1 of the drawings is preset to develop a ratio between $e_1$ and $e_2$. Therefore, the value of the voltage at the terminals 18 and 19 is represented by the expression $ae_1$ and $ae_2$, respectively.

Actually $a$ is a fraction of the entire potentiometer which is unity (or 1) and is equal to the reciprocal of the threshold ratio, assuming $k$ equal 0. Therefore, the values $ae_1$ and $ae_2$ represent preselected fractions of the respective voltages $e_1$ and $e_2$, as will appear more readily hereinafter.

It is to be understood that I am interested in determining whether the voltage ratio $$\frac{e_1}{e_2} \left(\text{or } \frac{e_2}{e_1}\right)$$

exceeds a predetermined value which is defined as the threshold ratio. If it is assumed that a threshold ratio of 4 is such that an alarm should be sounded because a defective journal has been detected, then I provide a means for determining whether ¼ of the larger voltage, for example, $e_1$ exceeds the smaller voltage, $e_2$ (i.e. ¼ $e_1 > e_2$). That is, I first provide an evaluation of ¼ of the larger voltage (¼ $e_1$) and compare that with the full magnitude of the smaller voltage ($e_2$); if the fraction of the larger voltage exceeds the smaller voltage then obviously a comparison between the fraction of the larger voltage and the smaller voltage will be a positive quantity. If desired, there may be provided an additional bias voltage to set a further threshold limitation to this positive quantity which must also be overcome before the alarm is actuated.

Each respective potentiometer 18 and 19 is connected to a circuit such as that shown in FIG. 2 of the drawings. For example, to one of such circuits, there is connected the potentials $ae_1$ and $e_2$, whereas to another of such circuits there is connected the potentials $e_1$ and $ae_2$. The gate 25 and amplitude recording means 26 provide the same functions as the gate and amplitude recording means shown at FIG. 3 of Patent No. 2,963,575 referred to above.

As seen in FIG. 2, the network indicated generally by the numeral 20 is a storage means to present stored signals of magnitudes reflecting the observed heat signal but without any phase displacement; thus a simultaneous read-out of the stored information will result in true differential evaluation. That is, considering circuit 35 first (it being understood that circuit 36 works in similar fashion) the signal across terminal 18 will be applied across storage condenser 28 while the full signal $e_2$ will be applied across storage condenser 29. Switch 27 which functions in the same manner as the switch shown in FIG. 3 of the said patent to control the discharge of the storage condensers shown therein, may be similarly actuated to control the read-out of storage condensers 28 and 29.

It should be noted that the fractional potential, that is, $ae_1$ or $ae_2$ is connected to the upper input terminal in FIG. 2 whereas the potential $e_1$ or $e_2$ is connected to the other input terminal.

A thyratron 21 is connected so that a zero potential is the lower voltage limit that must exist between the grid 30 and the cathode 31 to fire the tube. One means for obtaining the appropriate setting for the thyratron 21 and also to prevent the thyratron firing under idle conditions is with a preset bias voltage represented by the letter $k$, a voltage obtained by setting a potentiometer 22 to produce a desired mm. (millimeter) deflection on a chart or meter. A relay 33 is provided in the plate circuit of thyratron 21. The armature of relay 33 controls the actuation of alarm output 1 in any conventional manner, for example, according to the means shown in the said Patent No. 2,963,575. Further, when current flows through the thyratron indicating a defective journal, relay 33 opens, disconnecting the plate of the thyratron from the plate voltage supply thereof, quenching the thyratron. The thyratron is then ready to be fired again upon receipt of signals indicating any defective journal.

In order to explain the firing of thyratron 30, the threshold condition is set such that the voltage between the grid 30 and cathode 31 must be 0. When grid 30 becomes more positive than cathode 31, the thyratron will fire. The voltage between grid 30 and cathode 31 comprises the voltage difference between 40 and 41 (which actually is the value $ae_1$ minus $e_2$ minus the $k$ bias voltage which is positive). It is to be noted that when the voltage between terminals 40 and 41 is just enough to equal $k$, the grid to cathode potential is 0 or at threshold. Thus, so long as the voltage between terminals 40 and 41 exceeds to value $k$, the thyratron will fire. Thus, $k$ effects the control over the time at which the thyratron fires as well as providing a variation for the threshold ratio at which firing is desired.

Therefore, it may be seen now that the thyratron 21 will fire when the following relationship obtains:

$$ae_1 \geq e_2 + k$$

and the thyratron 21 will not fire for conditions represented by:

$$ae_1 < e_2 + k$$

The significance of this relationship is appreciated from the values in the following table, which values are obtained by substituting practical numerical values such as, for example, let $a$ equal ¼; $k$ equal 1 mm. of chart indication; and $e_2$ assume at various times normal chart deflections of 2, 3, 4 and 5 mm. (it is to be understood that mm. deflection is proportional to actual voltage). In the following table, there are shown various comparisons of threshold ratio $$\left(\frac{e_1}{e_2}\right)$$

variations as the biasing voltage is changed. For convenience throughout, voltages are expressed in millimeters (mm.) which correspond to the millimeter deflection a voltage would produce on a suitable indicating instrument. If, for example, three (3) volts produced a one (1) millimeter deflection, then the mm. values could easily be converted to actual voltage by multiplication by three (3). Of course, any other voltage-deflection relationship may be used. Once the threshold ratio is determined, then the necessary voltage $e_1$ may be readily calculated to determine whether the thyratron will fire:

| $e_2$ | $k=0; \frac{e_1}{e_2}$ | $e_1$ | $k=\frac{1}{2}; \frac{e_1}{e_2}$ | $e_1$ | $k=1; \frac{e_1}{e_2}$ | $e_1$ |
|---|---|---|---|---|---|---|
| 2 mm. | 4 | 8 | 5 | 10 | 6 | 12 |
| 3 | 4 | 12 | 4.67 | 14.0 | 5.33 | 16 |
| 4 | 4 | 16 | 4.50 | 18.0 | 5.0 | 20 |
| 5 | 4 | 20 | 4.44 | 22.2 | 4.8 | 24 |

As illustrated by the above table, for the smaller chart deflections, as under abnormal conditions of snow, fog, etc., the non-linear characteristic of the ratio table in accordance with the invention actually provides a ratio of $$\frac{e_1}{e_2}$$

which is larger than under normal operating conditions. Therefore, when a bias voltage $k$ is used, the threshold ratio varies slightly with voltage $e_2$.

The following is an illustration of the comparative operations of the present ratio detector and the straight diffential detector disclosed and claimed in said Patent No. 2,963,575.

Differential

Referring to the system shown in Patent No. 2,963,575, assume that a threshold potential of ten mm. is required to energize the alarm. For a condition when $e_1$ equals twenty mm. and $e_2$ equals five mm., the difference is fifteen mm. which is sufficient to energize the alarm.

Under conditions which attenuate the sensed potential, assume the $e_2$ equals two and one-half mm. and $e_1$ equals ten mm. Now the difference is only seven and one-half mm. which means that the alarm will not be operated.

Ratio

The present invention provides a ratio of $e_1$ to $e_2$. Assume that the value of $a$ is set at ¼ which means that the alarm would be energized when the voltage $e_1$ is at least four times the voltage $e_2$ (i.e. the inverse of ¼) and assume further for simplicity that $k$ equals 0, then the voltage ratio $$\frac{e_1}{e_2}$$

for $e_1$ equal to twenty mm. and $e_2$ equal to five mm. is 4 and the voltage ratio for $e_1$ equal to ten mm. and $e_2$ equal to two and one-half mm. is still 4 and the alarm will be energized.

Thereafter it is seen that the voltage or deflection obtained by the ratio system of this invention under the attenuated circumstances will result in energization of the alarm whereas the alarm would not function under the differential system.

The effect of the value $k$ has been explained previously but a more precise indication of this effect may be seen by referring to FIG. 5. FIG. 5 shows a graph with the voltage $e_2$ as the abscissa and the ratio $$\frac{e_1}{e_2}$$

as the ordinate. When $k$ equals 0, the ratio $$\frac{e_1}{e_2}$$

required to fire thyratron is a straight line at the value 4, meaning that when $e_1$ exceeds $e_2$ by a factor of 4, the thyratron will fire. However, because of the additional voltage $k$ supplied between the grid and cathode tending to bias the cathode in a more positive direction, it is seen that a lower voltages the ratio $$\frac{e_1}{e_2}$$

must be greater to effect thyratron firing. The actual determination of the form of these two curves follows from the equation mentioned above where the ratio $$\frac{e_1}{e_2}$$

is derived as follows:

$$ae_1 = e_2 + k$$

$$\frac{ae_1}{e_2} = 1 + \frac{k}{e_2}$$

$$\frac{e_1}{e_2} = \frac{1}{a}\left[1 + \frac{k}{e_2}\right]$$

The latter equation is pictorially shown as in FIG. 5.

It should be noted that the value $k$ provides a degree of flexibility to the system by introducing a nonlinearity which is most beneficial at low values of the voltages $e_1$ and $e_2$. In other words, the $k$ value makes the ratio higher and is most effective at low signal level conditions. The nonlinearity is shown more clearly at the left side of the graph of FIG. 5.

FIG. 4 shows a simple recorder, the pen of which is actuated in accordance with the current flowing therethrough in the manner of a galvanometer. By applying a voltage $ae_1$ to the upper terminal and $e_2$ to the bottom terminal, a voltage comparator is developed which may be used for the comparators 35 and 36 respectively shown in FIG. 1. When the voltage $ae_1$ exceeds $e_2$ by a predetermined amount, the graph will show a deflection reading above the longitudinal center line shown on said graph, which center line corresponds to the threshold ratio value. It is to be noted that while comparators are utilized in this invention, the actual evaluation is that of ratios and the comparator is actually used to determine whether a fraction of the first voltage $e_1$ exceeds the second voltage $e_2$.

While one form of the invention has been described in detail for illustrative purposes only, it will be understood that modifications and alterations may be made therein without departing from the true spirit and scope of the invention as defined in the claims which follow.

I claim:

1. An overheated journal warning system comprising an infrared detection device adapted to be mounted along one side of the rails of a length of railroad track,
   said detection device comprising heat responsive means producing an electrical signal in response to incident radiant energy and including optical means imaging said heat responsive means on passing railroad axles or axle boxes when so mounted,
   said infrared detection device producing a first signal,
   a second infrared detection device mounted alongside the other of the rails of a length of railroad track substantially across from said first detection device,
   said second infrared detection device comprising heat responsive means producing a second electrical signal in response to incident radiant energy and including optical means imaging said heat responsive means on passing railroad axles and axle boxes when so mounted on other side of said train,
   and ratio means responsive to said first and second signals to determine whether the ratio of said first and second signals exceeds a predetermined threshold,
   and means responsive to said ratio means when said threshold has been attained to provide an indication thereof.

2. A hot-box detecting system comprising plural heat sensor means to produce electrical signals respectively in response to incident radiant energy and adapted to be mounted on opposite sides of a railroad track,
   ratio forming means coupled to the respective outputs of said plural heat sensor means to develop an electrical potential in response to the ratio of electrical signals from a pair of said heat sensor means when said ratio exceeds a predetermined threshold,
   and means responsive to said ratio means to produce an indication when said predetermined threshold is attained.

3. A hot-box detecting system as set forth in claim 2 wherein a pair of said heat sensor means are positioned relative to each other to be responsive to journal boxes adjacent opposite ends of the same axle and said ratio means coupled to the output of said pair of heat sensor means.

4. An overheated journal warning system comprising a pair of inverted detection devices mounted along side respective rails of a length of railroad track at substantially opposite lengths, each of said inverted detective devices comprising heat responsive means to produce first and second electrical signals respectively in response to incident radiant energy and including optical means imaging said heat responsive means on passing railroad axles or axle boxes when so mounted, a first means to determine whether the ratio of said first signal to said second signal exceeds a predetermined threshold, second means to determine whether the ratio of said second signal to said first signal exceeds a second predetermined threshold and indicating means coupled to and responsive to the output of said first and second means to indicate whether either of said thresholds has been attained.

5. The system of claim 4 in which said first means includes means to provide a predetermined fractional voltage of said first signal, and first comparison means to compare said fractional signal with asid second signal and in which said utilization means is responsive to the output of said comparison means and in which said second means includes means to provide a fraction of said second signal and second comparison means to compare said first signal with said fraction of said second signal and in which said indicating means are responsive to the output of said first and second comparison means.

6. The system of claim 4 in which said thresholds are identical.

7. A hot-box detecting system comprising a plurality of heat sensor means adapted to be mounted in spaced apart relationship relative to each other on a section of railroad track to produce respectively a first and second electrical signal in response to incident radiant energy, said heat sensor means including optical means imaging said heat sensor means on passing railroad axles or journal boxes when so mounted, whereby separate transient electric pulse signals are developed by said heat sensor means, a first voltage producing means including first voltage dividing means responsive to said first signal, a second voltage producing means including second voltage dividing means responsive to said second signal, each of said voltage producing means being adapted to provide output signals representing full and fractional values of the input signals, first comparison means to compare the fractional output from said first voltage dividing means for said first signal and the full output from said second voltage producing means for said second signal, second comparison means to compare the fractional output of said second voltage dividing means for said second voltage and the full output of said first voltage producing means for said first voltage, and utilization means responsive to the outputs of both of said comparison means.

8. The system of claim 7 in which said utilization means includes an alarm which is energized when either of said fractional signals exceeds the signal that it is compared with.

9. A hot-box detecting system comprising a plurality of heat sensor units adapted to be mounted in spaced apart relationship relative to each other on a section of railroad track to provide respectively, first and second electrical signals in response to incident radiant energy, first ratio detecting means to determine whether the ratio of said first and second signals exceeds a predetermined threshold value, second ratio detecting means to determining whether the ratio of said second signal to said first signal exceeds a predetermined value, said first ratio detecting means including first fractional means coupled to the output of a first of said sensor units to produce an output signal having a value equal to a predetermined fraction, said fraction having a value substantially inverse to said threshold and means to compare the outputs from said fractional means with said second signal and to provide an indication when said fractional signal exceeds said second signal, said second ratio detecting means including second fractional means coupled to the output of a second of said sensor units to produce a second output signal having a value equal to a predetermined fraction, said fraction having a value substantially inverse to said threshold, means to compare the output from said second fractional means with said first signal to provide an indication when said second fractional signal exceeds said first signal, an electronic gate adapted to be opened when said first fractional voltage exceeds said second voltage or when said second fractional voltage exceeds said first voltage and indicating means responsive to the operation of said gate means to provide utilization signal.

10. The device of claim 9 in which additional bias control means are provided to vary the operating conditions of said gate.

11. The device of claim 10 in which said gate includes a thyratron, said fractional signal being applied to the grid of said thyratron, said control means connected to the cathode of said thyratron and means to apply said second signal to said control means.

12. A hot-box detecting device comprising at least two heat sensor units adapted to be mounted in spaced apart relationship relative to each other on a section of railroad track, each unit producing first and second electrical signals respectively in response to incident radiant energy, first means to reduce said first electrical signal by a predetermined amount to produce a first reduced signal, second means to reduce said second electrical signal by a predetermined amount, storage means adapted to store at least two signals, means to apply said first reduced signal to said storage means to be stored therein, means to apply said second signal to said storage means to be stored therein, an indicator means, gate means to actuate said indicator means, means to bias said gate means by a predetermined amount to a non-actuable position, differential circuit means coupled at the output thereof to said gate means, means to apply said stored signals to said differential circuit means, said gate being actuated when said first reduced electrical signal exceeds the magnitude of said second electrical signal by the amount of said bias.

13. The method determining excessive journal-box infrared-radiation conditions for a moving railroad car with an axle having two spaced journal boxes, comprising the steps of applying at one fixed trackside location a radiation image of one journal box to one infrared detector and obtaining a first signal therefrom, applying at a corresponding but opposite fixed trackside location a radiation image of the other journal box to another infrared detector and obtaining a second signal therefrom,
transiently evaluating whether the intensity ratio of said first signal to said second signal equals at least a predetermined ratio threshold,
transiently evaluating whether the intensity ratio of said second signal to said first signal equals at least a second predetermined ratio threshold,
developing an electrical signal in response to achievement of one of said thresholds,
and utilizing said signal to indicate that a journal box radiation is excessive, 14. The method of claim 13 in which said first and second predetermined ratio thresholds are equal.

15. The method of determining excessive journal box infrared radiation conditions for a moving railroad car with an axle having two spaced journal boxes,
comprising the steps of producing at one fixed trackside location a radiation image of one journal box to one infrared detector and obtaining a first signal therefrom,
applying at a corresponding but opposite fixed trackside location a radiation image of the other journal box to another infrared detector box and obtaining a second signal therefrom,
transiently evaluating whether the intensity ratio of said first signal to said second signal equals at least a predetermined ratio threshold,
developing an electrical signal in response to achievement of one of said thresholds and utilizing said signal to provide an indication when a journal box radiation is excessive.

16. The method of determining excessive journal box infrared radiation conditions for a moving railroad car with an axle having two spaced journal boxes,
comprising the steps of providing at one fixed trackside location a radiation image of one journal box to one infrared detector and obtaining a first signal therefrom,
providing at corresponding but opposite fixed trackside location a radiation image of the other journal box to another inverted detector and obtaining a second signal therefrom,
providing third and fourth signals having fractional values respective of said first and second signals and transiently evaluating whether the intensity ratio of said second to third signals equals at least a predetermined ratio threshold,
transiently evaluating whether the intensity ratio of said first signals to said fourth signal equals at least a second predetermined ratio threshold,
developing a control signal in response to the achievement of one of said thresholds and
utilizing said signal to indicate when a journal box radiation is excessive.

17. The method of claim 16 in which each of said predetermined ratio thresholds vary in accordance with the equation:

$$\text{Threshold ratio} = \frac{e_1}{e_2} = \frac{1}{a}\left[1 + \frac{k}{e_2}\right]$$

where $e_1$ represents the value of said first signal, $e_2$ represents the value of said second signal and $a$ is the preselected fraction determined in accordance with said ratio thresholds and $k$ is a fixed predetermined voltage.

18. In an overheated journal warning system having a plurality of infrared detection devices mounted along the sides of respective railroad tracks and having a heat responsive means producing first and second electrical signals respective in response to incident radiant energy and further including optical means imaging said heat responsive means on passing railroad axles or axle boxes and having an alarm system adapted to be actuated in response to a utilization signal,
the invention comprising a first ratio forming means to provide a ratio of said first signal to said second signal,
a second ratio forming means providing a ratio of said second signal to said first signal means,
means to indicate when either of said ratios exceed a predetermined threshold value to produce a utilization signal and
means adapted to couple the output of said utilization signal to said alarm system.

References Cited in the file of this patent
UNITED STATES PATENTS
2,963,575   Pelino et al. _____ Dec. 6, 1960
OTHER REFERENCES
S. H. A. German application 1,031,338, printed June 4, 1958 (Kl. 20 h 1), 2 pp. spec., 1 sht. dwg.